United States Patent
Chakraborty (10) Patent No.: US 10,075,891 B2
(45) Date of Patent: Sep. 11, 2018

(54) CAMPING APPROACH IN MULTI-SIM USER EQUIPMENT WHEN PRESENT IN COVERAGE HOLES OF RESPECTIVE NETWORK OPERATORS

(71) Applicant: INTEL IP CORPORATION, Santa Clara, CA (US)

(72) Inventor: Soumen Chakraborty, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 49 days.

(21) Appl. No.: 15/281,117

(22) Filed: Sep. 30, 2016

(65) Prior Publication Data

US 2018/0098262 A1    Apr. 5, 2018

(51) Int. Cl.
| | |
|---|---|
| *H04W 4/00* | (2018.01) |
| *H04W 36/36* | (2009.01) |
| *H04W 8/18* | (2009.01) |
| *H04W 76/50* | (2018.01) |
| *H04W 36/00* | (2009.01) |
| *H04W 48/18* | (2009.01) |

(52) U.S. Cl.
CPC ........... *H04W 36/36* (2013.01); *H04W 8/183* (2013.01); *H04W 76/50* (2018.02); *H04W 36/0083* (2013.01); *H04W 48/18* (2013.01)

(58) Field of Classification Search
None
See application file for complete search history.

(56) References Cited

U.S. PATENT DOCUMENTS

| | | | | |
|---|---|---|---|---|
| 2011/0086670 | A1* | 4/2011 | Shin | H04W 8/205 455/558 |
| 2012/0264425 | A1* | 10/2012 | Krishnamoorthy | H04W 48/16 455/434 |
| 2013/0303139 | A1* | 11/2013 | Helfre | H04W 4/16 455/417 |
| 2015/0065132 | A1* | 3/2015 | Ramkumar | H04W 52/0241 455/435.3 |
| 2015/0079986 | A1* | 3/2015 | Nayak | H04W 52/0229 455/435.2 |

(Continued)

OTHER PUBLICATIONS

Prashant Panigrahi, LTE and LTE Advanced Cell Selection Procedure, http://www.3glteinfo.com/lte-and-lte-advanced-cell-selection-procedure/, date Apr. 10, 2012, pp. 1-8.

*Primary Examiner* — Phirin Sam
(74) *Attorney, Agent, or Firm* — IPHORIZONS PLLC; Narendra Reddy Thappeta (57) ABSTRACT

A user equipment (UE) is equipped with multiple subscriber identity modules (SIMs). The UE identifies a situation requiring selection of a cell to camp on for a first SIM configured to operate using a first mobile network of a first network operator. The UE checks whether the UE is in a coverage hole of the first mobile network. If the UE is not in a coverage hole, the UE camps the first SIM in a cell of the first mobile network. If the UE is in a coverage hole, the UE determines whether any other SIM is already camped on a cell with support for limited service. If there is such other SIM, the UE suspends selection of the cell for the first SIM. Otherwise, the UE camps the first SIM on any acceptable cell for limited service.

20 Claims, 5 Drawing Sheets

(56) References Cited

U.S. PATENT DOCUMENTS

| | | | | |
|---|---|---|---|---|
| 2015/0133130 A1* | 5/2015 | Gupta | ................... | H04W 76/15 |
| | | | | 455/450 |
| 2015/0281929 A1* | 10/2015 | Shih | ....................... | H04W 4/90 |
| | | | | 455/404.1 |
| 2015/0312717 A1* | 10/2015 | Shih | ..................... | H04W 8/183 |
| | | | | 455/456.1 |
| 2016/0029204 A1* | 1/2016 | Lalwaney | ............... | H04W 8/22 |
| | | | | 455/418 |
| 2016/0095087 A1* | 3/2016 | Mohseni | .............. | H04W 72/02 |
| | | | | 455/558 |
| 2016/0219421 A1* | 7/2016 | Shi | ......................... | H04W 4/16 |
| 2016/0295550 A1* | 10/2016 | Sharma | ................... | H04W 4/16 |
| 2016/0345151 A1* | 11/2016 | Chen | ..................... | H04W 48/16 |
| 2017/0034677 A1* | 2/2017 | Bodduru | .................. | H04W 4/16 |
| 2017/0171902 A1* | 6/2017 | Tillman | ............... | H04W 76/026 |
| 2017/0230932 A1* | 8/2017 | Challa | ................... | H04W 68/02 |
| 2017/0257807 A1* | 9/2017 | Zacharias | ............. | H04W 36/14 |
| 2017/0280507 A1* | 9/2017 | Wang | ..................... | H04L 5/0007 |
| 2017/0318523 A1* | 11/2017 | Lindoff | ................. | H04W 48/20 |
| 2017/0325144 A1* | 11/2017 | Raghunathan | ........ | H04W 36/16 |

\* cited by examiner

CAMPING APPROACH IN MULTI-SIM USER EQUIPMENT WHEN PRESENT IN COVERAGE HOLES OF RESPECTIVE NETWORK OPERATORS

BACKGROUND

Technical Field

Aspects of the present disclosure relate generally to wireless mobile devices, and more specifically to camping approach in multi-SIM user equipment when present in coverage holes of respective network operators.

Related Art

Wireless user equipment (UEs) or wireless devices in general, refer to instruments such as mobile phones using which users connect with mobile telephone networks on a wireless medium. In a common scenario, a UE interfaces with a base station of a mobile telephone network providing the corresponding user the facility of voice and data based services.

UEs are provided with subscriber identity modules (SIMs). A SIM typically contains various information such as telephone number, the international mobile subscriber identity (IMSI) number (also the phone number) used by a network operator (or service provider, in general) to identify and authenticate a subscriber, security keys, temporary information related to the local network, a list of the services provided by the network operator, etc.

A single UE may be provided with multiple SIMs, for example, to facilitate the UE to communicate with two different telephone networks provided by respective network operators (e.g., AT&T Mobility, Verizon, and Sprint). Typically each SIM in operation is configured associated with a corresponding network operator, causing the UE to attempt to interface primarily (or first) with the base stations of the configured operator. Each base station has a coverage area representing the geographical area in which the signals transmitted by the base station can be reliably received.

A coverage hole for a network operator refers to a geographical area which is not within the coverage areas of the corresponding base stations (provided by the network operator). Coverage holes can be outside of the boundaries of the cells or within the geographical boundaries of a cell for reasons such as obstruction in the transmission path of the base station.

A UE generally camps on a cell upon being powered on and potentially camps on a different cell as the UE is moved across coverage areas of respective cells. Camping on a cell refers to associating with the base station (or eNodeB) defining the cell for purposes of communicating with the mobile telephone network. The UE first attempts to camp on a cell of a network operator specified in the SIM card, in which case the camped cell may be referred to as a 'suitable cell'. When camped in a suitable cell, the UE is provided the ability to access all the services the subscriber is entitled to use.

However, if there is no such suitable cell, the UE may attempt to camp on a cell of some other network operator such that the UE is available for limited service such as (one or more of) emergency calls, disaster alerts, etc. When camped in cell with only limited service, one may not make other/normal voice/data calls that would be only available in suitable cells.

Aspects of the present disclosure are directed to such approaches to camping when a multi-SIM user equipment is present in coverage holes of network operators.

BRIEF DESCRIPTION OF THE VIEWS OF DRAWINGS

Example aspects of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A wireless device is equipped with multiple subscriber identity modules (SIMs). The wireless device identifies a situation requiring selection of a cell to camp on for a first SIM configured to operate using a first mobile network of a first network operator. The UE checks whether the wireless device is in a coverage hole of the first mobile network. If the wireless device is not in a coverage hole, the wireless device camps the first SIM in a cell of the first mobile network.

If the wireless device is in a coverage hole, the wireless device determines whether any other SIM (of the wireless device) is already camped on a cell with support for limited service. If there is such other SIM, the wireless device suspends selection of the cell for the first SIM. Otherwise, the wireless device attempts to camp the first SIM on any acceptable cell (of mobile networks other than the first mobile network) for limited service.

Thus, the wireless device may reduce power consumption in situations when at least one SIM is already camped on a cell with limited services since attempt to camp on cells for limited services is avoided for other SIMs. At the same time, the subscriber has the ability to avail of limited services since one of the SIMs is already camped on a cell with limited service.

According to an aspect of the present disclosure, the situation requiring selection may corresponds to reselection in situations such as losing synchronization with a serving base station, finding another cell (of same network operator) with a better signal quality.

According to one more aspect of the present disclosure, the wireless device checks whether the first SIM (noted above) is denied registration by the first mobile network.

The wireless device is deemed to be in a coverage hole if the first SIM has been denied registration by the first mobile network.

Several aspects of the present disclosure are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the disclosure.

2. Example Environment

Figure 1:
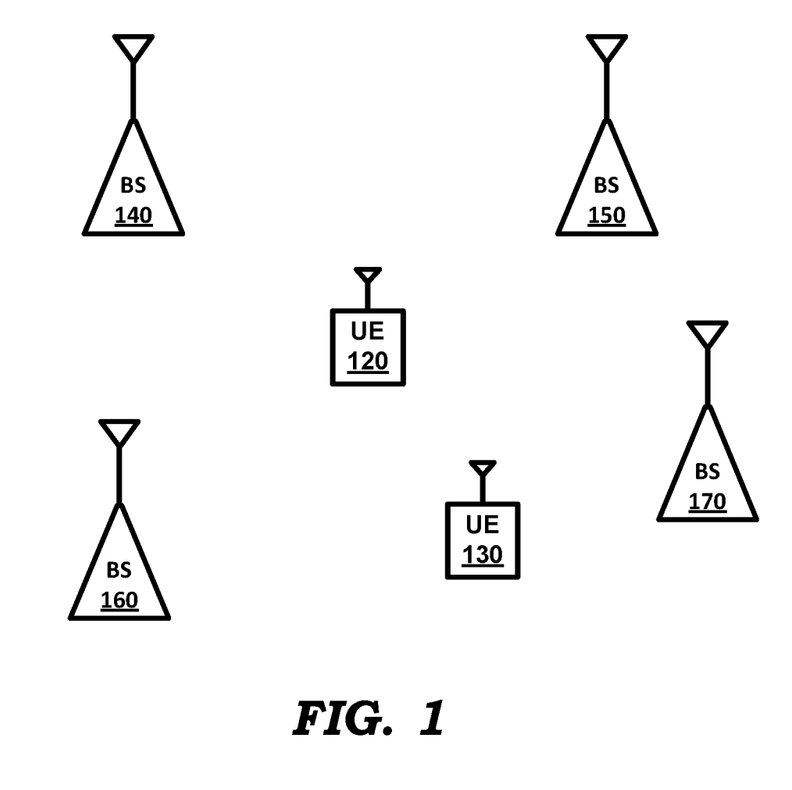
FIG. 1 is a block diagram of an example environment in which several aspects of the present disclosure can be implemented.

FIG. 1 is a block diagram representing an example environment in which several aspects of the present disclosure can be implemented. The example environment is shown containing only representative devices and systems for illustration. However, real world environments contain more systems/devices. FIG. 1 is shown containing base stations 140, 150, 160 and 170, and user equipment (UE) 120 and UE 130.

Each of base stations (BS) 140, 150, 160 and 170 is a fixed communications unit of respective mobile networks deployed by a same or different network operator (e.g., AT&T mobility, Sprint, etc.) and provides the last-mile (or last hop) communications link to UEs that are within communications range (i.e., within the coverage area) of the corresponding base station. For illustration, it is assumed that BS 140 and 170 are related to one network operator, BS 150 is related to another network operator and BS 160 is related to yet another network operator.

In the context of LTE, each of base stations 140, 150, 160 and 170 is referred to as an EnodeB. Each of the base stations and corresponding UEs within their coverage area (such as UE 120 and UE 130) may operate according to any standards/specifications for wireless mobile communications such as, for example, GSM (Global System for Mobile Communications), LTE (Long Term Evolution, including frequency division duplex (FDD) and/or time division duplex (TDD) modes), UMTS (Universal Mobile Telecommunications System), CDMA (Code Division Multiple Access), W-CDMA (Wideband CDMA), 5G, etc.

Although not shown in FIG. 1, each of the base stations may be connected to other devices/systems in the corresponding cellular network infrastructure to enable UEs in coverage range to communicate with devices (e.g., other UEs), with landline communications equipment in a conventional PSTN, public data networks such as the internet etc.

UE 120 and UE 130 represent example wireless devices such as mobile phones and other devices, and may be used for wireless communication such as voice calls, data exchange such as web browsing, receiving and sending emails, etc. One or both of UE 120 and UE 130 may be a multi-SIM device. For example, it is assumed herein that UE 120 is a multi-SIM device. Merely to simplify description, it is assumed herein that each of the multiple SIMs of UE 120 is designed to be associated with a different network operator. However, various aspects of the present disclosure are applicable when all the SIMs are associated with a same network operator also.

When signals from the respective base stations of the corresponding network operators are available where UE 120 is (currently) located (i.e., UE 120 is in a coverage area of all the network operators), UE 120 would operate to camp the multiple SIMs in respective suitable cells corresponding to the respective network operators. In such a situation, UE 120 may be capable of voice and data calls on all the SIMs.

However, if UE 120 is at a location (or moves into a location) where there is no coverage from at least one of the network operators corresponding to the multiple SIMs, then the camping approach employed by UE 120 is as described next with respect to a flowchart.

3. Camping Approach in a Multi-SIM UE

Figure 2:
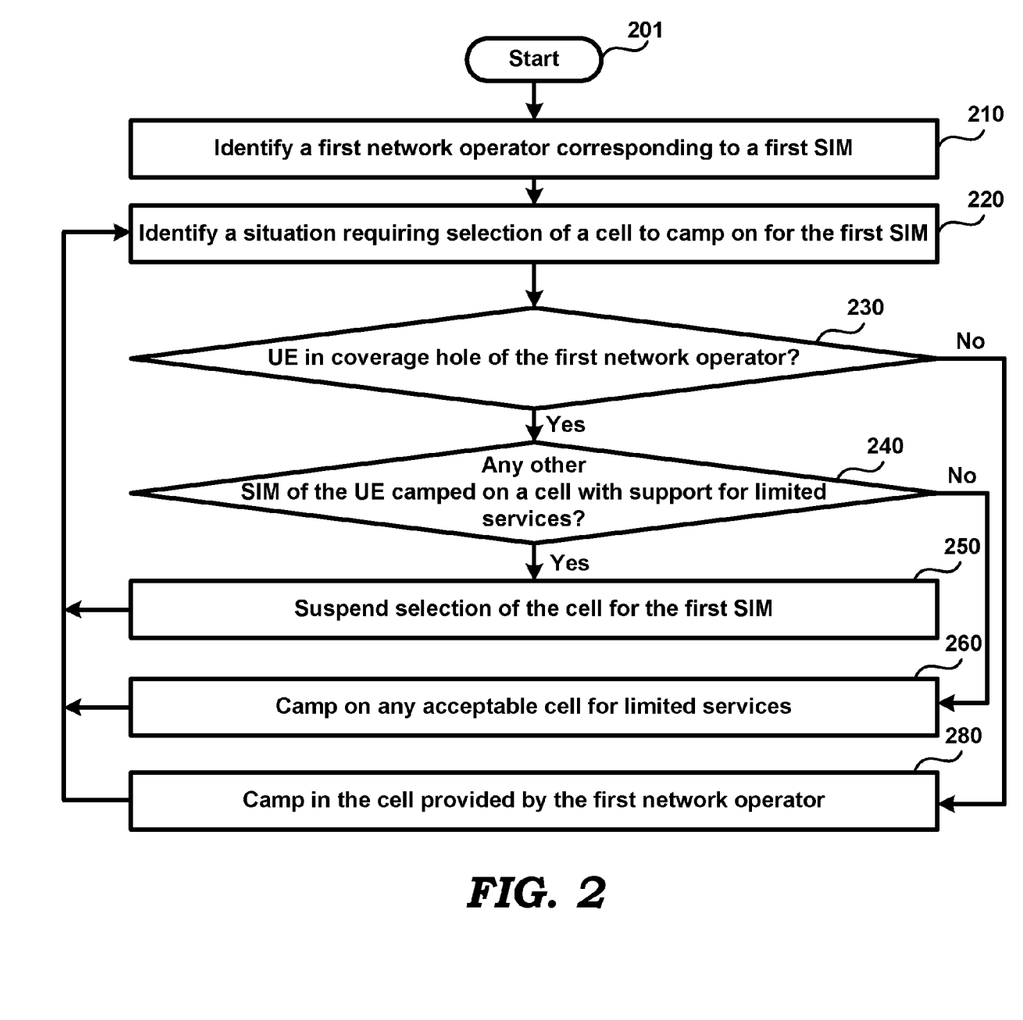
FIG. 2 is a flowchart illustrating a camping approach when a multi-SIM user equipment (UE) is present in coverage holes of a network operator, according to aspects of the present disclosure.

FIG. 2 is a flowchart illustrating a camping approach when a multi-SIM user equipment (UE) is present in coverage holes of a network operator, according to aspects of the present disclosure. The flowchart is described with respect to UE 120 of FIG. 1, merely for illustration. However, various features described herein can be implemented in other environments and using other components as well, as will be apparent to one skilled in the relevant arts by reading the disclosure provided herein. Further, the steps in the flowchart are described in a specific sequence merely for illustration. Alternative aspect of the present disclosures using a different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, UE 120 identifies a first network operator corresponding to a first SIM. The network operator may be identified based on data stored in the first SIM in a known way. Control then passes to step 220.

In step 220, UE 120 identifies a situation requiring selection of a cell to camp on for the first SIM. The situation can be, for example, when UE 120 is powered on, thereby requiring UE 120 to select a suitable cell for camping of the first SIM. As another example, UE 120 may seek to reselect another cell from the same network operator when the previously selected cell (or signals from the base station defining the selected cell) has low signal strength.

As yet another example, UE 120 may have lost synchronization with the current serving suitable cell, and might need to re-establish connection with such a suitable cell. Synchronization refers to a situation in which the carrier signals generated at UE 120 and the base station that UE 120 is connected to, are aligned in terms of the frequency and phase. Synchronization may also relate to time synchronization, according to which UE 120 and the base station maintain the same time reference. Control then passes to step 230.

In step 230, UE 120 determines whether the UE is in a coverage hole of the first network operator. Such a determination can be made by scanning the corresponding frequency bands for carrier signals from a base station which corresponds to the first network operator. Control passes to step 240 if UE 120 is in a coverage hole, and to step 280 otherwise.

In step 240, UE 120 checks whether any other SIM (e.g., second SIM) of the UE is camped on a cell with support for limited service. Such a condition may be satisfied, for example, if the second SIM is camped on a corresponding acceptable cell which supports limited service. Alternatively, the condition is satisfied if the second SIM is camped on a corresponding suitable cell, which supports limited service in addition to the normal services (e.g., voice/data calls) provided to the subscribers. Thus, the cell with support for limited service can be either an acceptable cell or a suitable cell (to the extent the suitable cell provides support for limited service).

When operating in LTE networks, the terms suitable cell and acceptable cell are as defined by 3GPP (3$^{rd}$ Generation Partnership Project) in Technical Specifications 36.304. In particular, a suitable cell is defined to be a cell on which a UE may camp on to obtain normal service. An acceptable cell is defined to be a cell on which a UE may camp to obtain limited service. Limited service refers to services that enable a UE to make emergency calls and receive alerts such as those noted in sections below. Control passes to step 250 if the condition is satisfied, and to step 260 otherwise.

In step 250, UE 120 suspends selection of the cell for the first SIM. Suspension implies ceasing additional processing steps for the purpose of determining a cell for camping the first SIM. Due to the avoidance of additional processing, advantages such as reduction of power consumption may be obtained. Accordingly such advantages may be realized if the second SIM is already camped on an acceptable cell or a suitable cell providing support for limited service. Control then passes to step 220.

In step 260, UE 120 camps the first SIM on any acceptable cell for limited service. From the above noted description, it may readily be appreciated that such an acceptable cell is from a network operator other than the first network operator (configured in the first SIM) and such an acceptable cell needs to support only limited service using the first SIM. Control then passes to step 220.

In step 280, UE 120 camps the first SIM in a suitable cell provided by the first network operator. It may be readily appreciated that such a suitable cell exists in view of the failure of the condition of step 230 noted above. Once thus camped on a suitable cell, UE 120 continues to camp on such suitable cell, unless or until synchronization with the serving base station (of the suitable cell) is lost. If such synchronization is lost, then control passes to step 220, and the corresponding steps of the flowchart are executed.

The steps of the flowchart of FIG. 2 may be repeatedly performed. Thus, for example, UE 120 may, at periodic intervals, re-evaluate whether the first SIM (if not already camped in a suitable cell) can be camped on a suitable cell, and hence perform the corresponding steps of the flowchart of FIG. 2.

Thus, if UE 120 determines that one of the SIMs is already camped in a suitable cell (or in an acceptable cell) with support for limited service, then UE 120 prevents an 'out of coverage' SIM from executing procedures for camping on any acceptable cell to access limited service. As further described below, attempts by UE 120 to access such limited service using the out of coverage SIM, when another SIM in UE 120 already has access to such limited service, may result in unnecessary power consumption. The terms "Limited Service" and "acceptable cell selection" are defined and described in TS 36.304, section 5.1 (titled 'PLMN selection') by the 3GPP (3$^{rd}$ Generation Partnership Project).

The operations noted above are further illustrated next with example scenarios.

4. Examples

Figure 3:
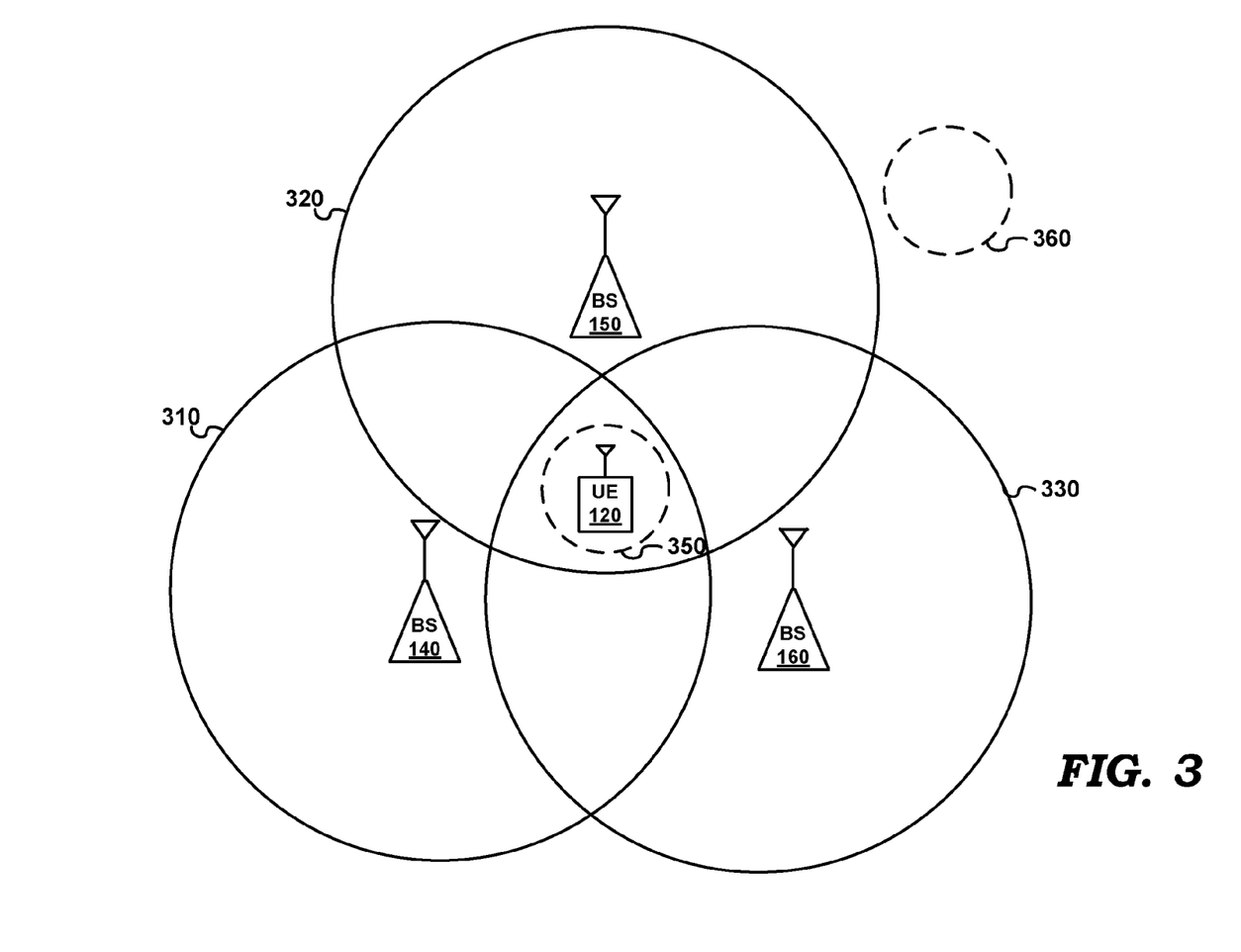
FIG. 3 depicts an example scenario in which a UE is located in a coverage hole of a network operator.

FIG. 3 is a diagram showing UE 120 and three base stations BS 140, BS 150 and BS 160. It is assumed in the description below, that UE 120 is equipped with two SIMs (SIM1 and SIM2), and that SIM1 and SIM2 are associated with two different network operators, each providing LTE service. Further, it is assumed that BS 140 is deployed by the network operator (e.g., AT&T Mobility) with which SIM1 is associated, while BS 150 is deployed by the network operator (e.g., Sprint) with which SIM2 is associated. It is assumed in the following description that SIM2 is the 'first SIM' of step 210 of the flowchart of FIG. 2, while SIM1 is the 'second SIM' of step 240.

Each of circles 310, 320 and 330 corresponds to a cell (referred to herein as cell 310, cell 320 and cell 330 respectively), and represents the outer limits of a normal coverage area provided by BS 140, BS 150 and BS 160 respectively. In practice, the coverage area of a cell is typically a hexagon, although shown as a circle in FIG. 3. Circle 350 represents an example area in which there is no coverage from BS 150, but in which there is coverage from BS 140 and BS 150. Circle 350 thus represents a coverage hole of BS 150, and is an example where a coverage hole exists within the boundaries of a cell (here cell 320).

Circle 360 represents another area in which there is no coverage from BS 150 (and also BS 140 and BS 150), but which may be covered by some other cell (not shown). Circle 360 thus represents a coverage hole of BS 150 that is outside cell 320. In the description below, it is assumed that UE 120 is located within circle 350. It is also assumed that limited service (which includes emergency services and disaster alerts) is supported by all three base stations 140, 150 and 160.

Since UE 120 is in a coverage area of BS 140, SIM1 of UE 120 camps on cell 310, which represents a 'suitable cell' for SIM1. Prior to camping SIM1 on suitable cell 310, UE 120 would have performed the associated operations for "initial cell selection" (when no stored information regarding earlier camped cells is available) or make use of stored information to shorten the search ("stored information cell selection") for SIM1.

Thus, among other operations, UE 120 would have done a scan of the frequency bands specified by AT&T (the network operator associated with SIM1) according to the radio access technology (LTE, 3G, etc.) that was subscribed to by SIM1, and identified cell 310 as the strongest cell (signals from BS 310 have a strength above a predetermined threshold). UE 120 would then have processed system information (e.g., in the form of System Information Blocks (SIB) and Master Information Blocks (MIB), and which includes the network operator's ID) broadcast by BS 140 to determine that it belongs to SIM1's network operator. UE 120 then registers its presence in cell 310.

In the context of LTE, such registration is performed by the NAS (Non Access Stratum) component of the LTE protocol stack for SIM1. Assuming the registration is successful, UE 120 then camps SIM1 on cell 310. A camped state on suitable cell implies registration with the cell was successful. UE 120 may then send and/or receive voice and data on SIM1 via BS 140.

It should be appreciated that a base station (or mobile telephone network of a configured network operator in general) may deny registration to an UE for reasons such as non-payment of applicable fees. According to an aspect of the present disclosure, such refusal of registration is also deemed to be a coverage hole.

In addition, UE 120 determines if limited service is supported by BS 140. Limited service provides UE 120 the ability (here via SIM1) to make emergency phone calls, and also to receive alerts such as those provided by Earthquake and Tsunami Warning System (ETWS), Public Warning System (PWS) and Commercial Mobile Alert System (CMAS). As noted above, it is assumed that all of BS 140, 150 and 160 support limited service.

On the other hand, since UE 120 is located in circle 350 in which there is no coverage from BS 150, UE 120 using similar cell selection procedures (step 220) noted above with respect to SIM1 (but performed here for SIM2) would have determined (based for example on absence in the corresponding frequency bands of any signals) that UE 120 is in a coverage hole of the network operator (assumed to be Sprint as noted above) associated with SIM2 (step 230).

Therefore, UE 120 checks (e.g., internal data structures illustrated in FIG. 5 below) if SIM1 is camped on a cell with limited service support (step 240). Since SIM1 is already camped on a suitable cell and since limited service is supported on the suitable cell, UE 120 suspends operations for camping on an acceptable cell for SIM2 (step 250). Suspension of operations for camping on an acceptable cell for SIM2 implies that UE 120 would not perform operations such as scanning of frequency bands for determining if a carrier is present in any of the scanned frequency bands, etc. As a result, unnecessary power consumption in UE 120 is avoided, while UE 120 still has access to limited service using SIM1.

However, had UE 120 been located where coverage is available for both SIMs, then each of the SIMs would be camped in a suitable cell (BS 140 and BS 150 respectively for SIM1 and SIM2 (step 280). If UE 120 were to be located in an area in which coverage is not available for SIM2 and if SIM1 were camped in an acceptable cell in which limited service is not supported, then UE 120 would attempt to camp SIM2 in an acceptable cell (e.g., cell 330, assuming coverage from BS 160 is available in area 350).

UE 120 may periodically check if a cell (suitable cell or acceptable cell) needs to be selected (or reselected) for either SIM1 or SIM2, and may therefore execute the corresponding operations of the flowchart of FIG. 2 described in detail above. For example, even though cell selection procedures have been suspended (in the example above) for SIM2, UE 120 may after a certain period of time re-evaluate whether a suitable cell can be found for SIM2. Alternatively, or in addition, UE 120 may perform a cell reselection procedure for SIM2 to identify if a better cell (than the one evaluated earlier) in terms of signal power/quality can be found for SIM2. Depending on the outcome of such periodic evaluations, UE 120 may proceed to execute the corresponding operations noted above with respect to the flowchart of FIG. 2.

The description is continued with an illustration of the implementation details of UE 120 in an aspect of the present disclosure of the present disclosure.

5. User Equipment

Figure 4:
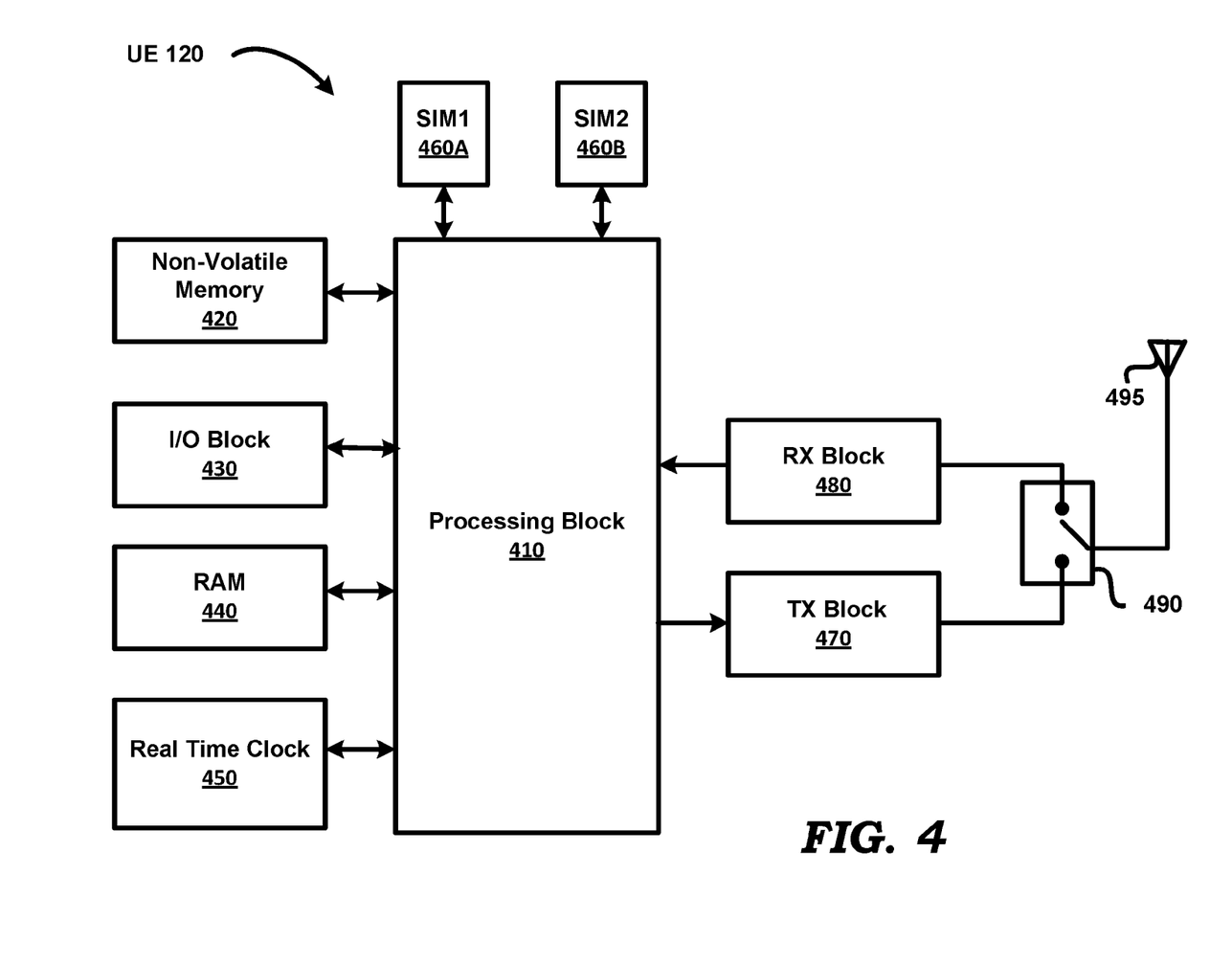
FIG. 4 is a block diagram representing an example User Equipment (UE) in which several aspects of the present disclosure can be implemented.

FIG. 4 is a block diagram representing an example User Equipment (UE) in which several aspects of the present disclosure can be implemented. UE 120 is shown containing processing block 410, non-volatile memory 420, input/output (I/O) block 430, random access memory (RAM) 440, real-time clock (RTC) 450, SIM1 460A, SIM2 460B, transmit (Tx) block 470, receive (Rx) block 480, switch 490, and antenna 495. Some or all units of UE 120 may be powered by a battery (not shown). In another aspect of the present disclosure, UE 120 is mains-powered and contains corresponding components such regulators, filters, etc. The specific blocks of UE 120 are shown by way of illustration only, and UE 120 may contain more or fewer blocks depending on specific requirements. In an aspect of the present disclosure, UE 120 corresponds to a mobile phone supporting dual-SIM. Further, it is assumed herein that the two SIMs share a same receiver (Rx Block 480) and a same transmitter (Tx Block 470). However, in another aspect of the present disclosure, separate receivers and transmitters are provided for use by the respective SIMs.

Each of SIM1 460A and SIM2 460B represents a subscriber identity module (SIM) that may be provided by a network operator. A SIM may store the international mobile subscriber identity (IMSI) number (also the phone number) used by a network operator to identify and authenticate a subscriber. Additionally, a SIM may store address book/ telephone numbers of subscribers, security keys, temporary information related to the local network, a list of the services provided by the network operator, etc. Though not shown, the UE is equipped with two holders, each for housing a respective one of the two SIMs 360A and 360B. Typically, the SIM is 'inserted' into such housing before the UE can access the services provided by the network operator for subscriber configured on the SIM.

Processing block 410 may read the IMSI number, security keys etc., in transmitting and receiving voice/data via Tx block 470 and RX block 480 respectively. SIM1 and SIM2 may subscribe to data and voice services according to one of several radio access technologies such as GSM, LTE (FDD as well as TDD), CDMA, WCDMA, 5G, etc., as also noted above. Further, the type of radio access technology available to the two SIMs can be the same (e.g., LTE on both SIMs), or different (e.g., LTE on one SIM and 4G on the other SIM, LTE on one SIM and CDMA on the other SIM, etc.).

RTC 450 operates as a clock, and provides the 'current' time to processing block 410. Additionally, RTC 450 may internally contain one or more timers. I/O block 430 provides interfaces for user interaction with UE 120, and includes input devices and output devices. The input devices may include a keypad and a pointing device (e.g., touchpad). Output devices may include a display with touch-sensitive screen.

Antenna 495 operates to receive from, and transmit to, a wireless medium, corresponding wireless signals (representing voice, data, etc.) according to one or more standards such as LTE. Switch 490 may be controlled by processing block 410 (connection not shown) to connect antenna 495 to one of blocks 470 and 480 as desired, depending on whether transmission or reception of wireless signals is required. Switch 490, antenna 495 and the corresponding connections of FIG. 4 are shown merely by way of illustration. Instead of a single antenna 495, separate antennas, one for transmission and another for reception of wireless signals, can also be used.

TX block 470 receives, from processing block 410, digital signals representing information (voice, data, etc.) to be transmitted on a wireless medium (e.g., according to the corresponding standards/specifications), generates a modulated radio frequency (RF) signal (according to the standard), and transmits the RF signal via switch 490 and antenna 495. TX block 470 may contain RF circuitry (mixers/up-converters, local oscillators, filters, power amplifier, etc.) as well as baseband circuitry for modulating a carrier with the baseband information signal. Alternatively, TX block 470 may contain only the RF circuitry, with processing block 410 performing the modulation and other baseband operations (in conjunction with the RF circuitry).

RX block 480 represents a receiver that receives a wireless (RF) signal bearing voice/data and/or control information via switch 490, and antenna 495, demodulates the RF signal, and provides the extracted voice/data or control information to processing block 410. RX block 480 may contain RF circuitry (front-end filter, low-noise amplifier, mixer/down-converter, filters) as well as baseband processing circuitry for demodulating the down-converted signal. Alternatively, RX block 480 (the receive chain) may contain only the RF circuitry, with processing block 410 performing the baseband operations in conjunction with the RF circuitry Non-volatile memory 420 is a non-transitory machine readable medium, and stores instructions, which when executed by processing block 410, causes UE 120 to operate as described herein. In particular, the instructions enable UE 120 to operate as described with respect to the flowchart of FIG. 2. The instructions may either be executed directly from non-volatile memory 420 or be copied to RAM 440 for execution.

RAM 440 is a volatile random access memory, and may be used for storing instructions and data. RAM 440 and non-volatile memory 420 (which may be implemented in the form of read-only memory/ROM/Flash) constitute computer program products or machine (or computer) readable medium, which are means for providing instructions to processing block 410. Processing block 410 may retrieve the instructions, and execute the instructions to provide several features of the present disclosure.

Processing block 410 (or processor in general) may contain multiple processing units internally, with each processing unit potentially being designed for a specific task. Thus, processing block 410 may be implemented as multiple separate processing cores, one each for handling operations required for each of multiple SIMs (e.g., SIM1 and SIM2). Alternatively, processing block 410 may represent a single processing unit executing multiple execution threads in software, each execution thread for handling operations required for a corresponding one of multiple SIMs. In general, processing block 410 executes instructions stored in non-volatile memory 450 or RAM 440 to enable UE 120 to operate according to several aspects of the present disclosure, described in detail herein.

Figure 5:
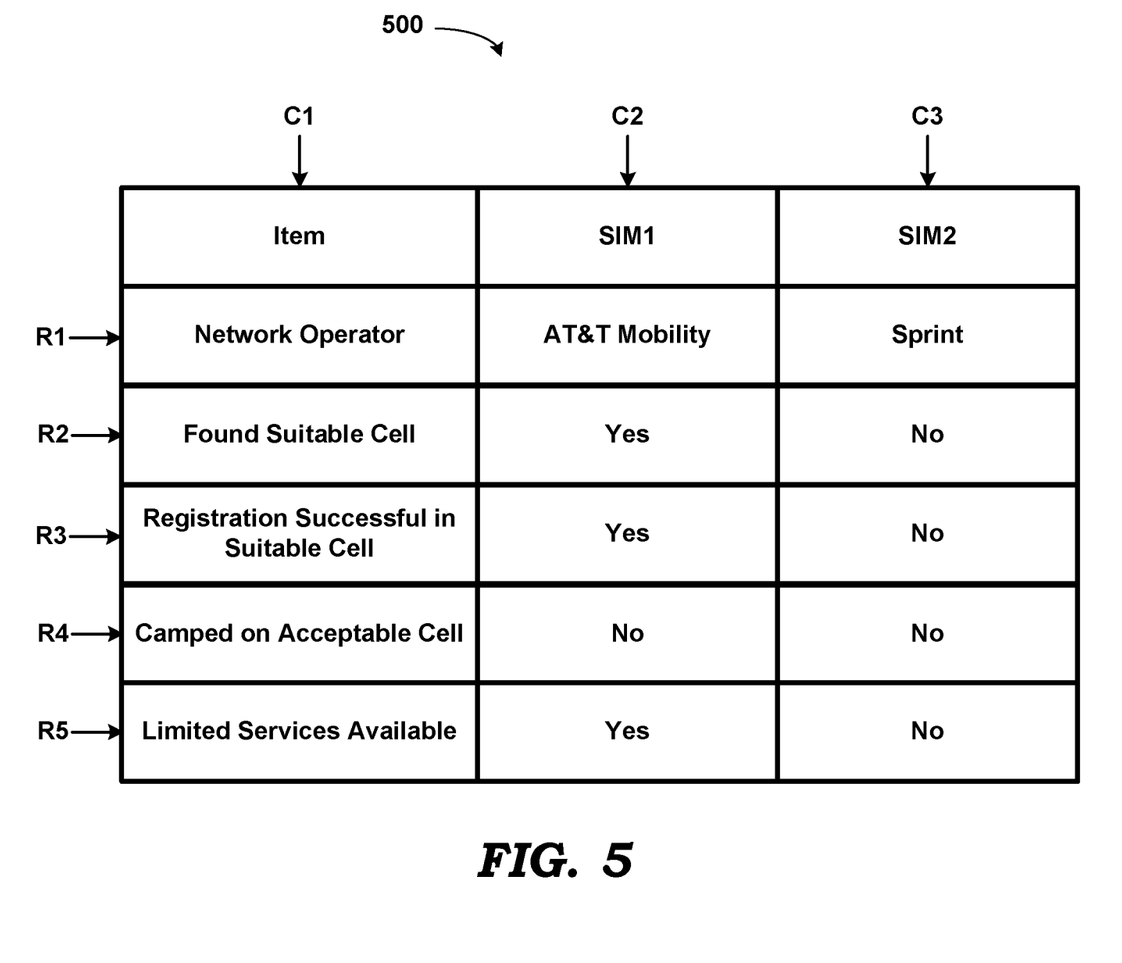
FIG. 5 is a diagram of a table used to store status indications for respective SIMs in a UE, in an aspect of the present disclosure.

In an aspect of the present disclosure, processing block 410 maintains a table in RAM 440 (or alternatively in non-volatile memory 420), with entries in the table indicating the status of cell connectivity for SIM1 and SIM2. Table 500 of FIG. 5 represents such an example table. Column C1 lists various pieces of information (items) corresponding to SIM1 and SIM2, while column C2 and C3 respectively contain status entries for the corresponding item in column C1. Row R1 specifies the network operator associated with SIM1 and SIM2. Row R2 specifies the status indicating whether a SIM has found a suitable cell or not. Row R3 specifies the status indicating whether a SIM has successfully registered itself in the suitable cell or not. Row R4 specifies the status indicating whether a SIM is camped on an acceptable cell or not. Row R5 specifies the status indicating whether a SIM has access to limited service or not.

Processing block 410 populates entries of table 500 with corresponding information during operation of UE 120. Processing block 410 ascertains the status entries of one SIM (e.g., SIM1) prior to operations for camping the other SIM (e.g., SIM2), and performs the corresponding operations (including no operation or suspension of operation) with respect to the other SIM as described in detail above.

In FIG. 5, the network operator associated with SIM1 and SIM2 are indicated to respectively be AT&T Mobility and Sprint. The other status entries (Yes or No) shown in FIG. 5 correspond to a situation in which SIM1 has found a suitable cell and registered successfully with the suitable cell, limited service is available to SIM1, and SIM1 is not camped on an acceptable cell. The status entry in row R1/column C3 indicates that SIM2 has not found a suitable cell. Accordingly, processing block 410 suspends operations for selection of an acceptable cell for the SIM2. The status entries for SIM2 corresponding to the items in row R3, R4 and R5 are shown as 'No'.

6. Conclusion

References throughout this specification to "one aspect of the present disclosure", "an aspect of the present disclosure", or similar language means that a particular feature, structure, or characteristic described in connection with the aspect of the present disclosure is included in at least one aspect of the present disclosure of the present invention. Thus, appearances of the phrases "in one aspect of the present disclosure", "in an aspect of the present disclosure" and similar language throughout this specification may, but do not necessarily, all refer to the same aspect of the present disclosure.

Thus, in example 1, the wireless device contains respective holders for housing a first SIM and a second SIM. When the wireless device requires to select a cell to camp on for the first SIM configured to operate using a first mobile network of a first network operator, the wireless device checks whether the wireless device is in a coverage hole of the first mobile network. If the wireless device is found to be in the coverage hole, the wireless device determines whether any other SIM of the wireless device is already camped on a cell with support for limited service. If the any other SIM is already found to be camped on a cell with support for limited service, the wireless device suspends (or ceases) selection of the cell for the first SIM. However, if no other SIM is already camped on a cell with support for limited service, the wireless device attempts camping on any acceptable cell for limited service.

In example 2, the wireless device of example 1 optionally camps the first SIM in a first cell of the first mobile network if the wireless device is not in the coverage hole.

In example 3, the wireless device of examples 1 or 2, performs the selection optionally for the purpose of reselection (for example, in the event of loss of synchronization with the earlier camped cell).

In example 4, the wireless device of example 3, optionally checks periodically whether the first SIM is camped in a suitable cell, and performs the above noted selection of a cell (for camping) when the first SIM is determined not to be camped in a suitable cell.

In example 5, the wireless device of examples 1-4 checks whether the first SIM has been denied registration by the first mobile network, wherein the wireless device is deemed to be in the coverage hole if the first SIM has been denied registration by the first mobile network.

The features of the above examples are also shown as implemented as respective methods, and also as a computer readable medium storing instructions which upon execution causes the above noted features to be operative.

While various aspects of the present disclosure have been described above, it should be understood that they have been presented by way of example only, and not limitation. Thus, the breadth and scope of the present disclosure should not be limited by any of the above-described aspects, but should be defined only in accordance with the following claims and their equivalents.

I claim:

1. A wireless device comprising:
   a first holder for housing a first subscriber identity module (SIM);
   a second holder for housing a second SIM,
   the first SIM, the second SIM and any other SIM associated with the wireless device forming a plurality of SIMs; and
   a processing block configured to identify a situation requiring selection of a cell to camp on for the first SIM configured to operate using a first mobile network of a first network operator, the first SIM being contained in the plurality of SIMs, upon identification of the situation, the processing block further configured to:
   check whether the wireless device is in a coverage hole of the first mobile network;
   if the wireless device is in the coverage hole, determine whether any other SIM of the plurality of SIMs is already camped on a cell with support for at least limited service;
   if at least one other SIM of the plurality of SIMs is already camped on a cell with support for at least limited service, suspend selection of the cell for the first SIM; and
   if no other SIM of the plurality of SIMs is camped on a cell with support for at least limited service, camp for the first SIM on any acceptable cell for limited service.

2. The wireless device of claim 1, wherein the cell with support for at least limited service is one of a suitable cell and an acceptable cell.

3. The wireless device of claim 1, if the wireless device is not in the coverage hole, wherein the wireless device is further configured to camp the first SIM in a first cell of the first mobile network.

4. The wireless device of claim 1, wherein the first SIM is camped on a third cell prior to the identifying such that the selection comprises a reselection.

5. The wireless device of claim 1, further configured to:
   check periodically whether the first SIM is camped in a suitable cell, wherein the situation comprises a determination that the first SIM is not camped in a suitable cell.

6. The wireless device of claim 1, wherein the checking further checks whether the first SIM has been denied registration by the first mobile network, wherein the wireless device is deemed to be in the coverage hole if the first SIM has been denied registration by the first mobile network.

7. The wireless device of claim 1, wherein the wireless device is designed to operate according to LTE (Long Term Evolution) for each of the first SIM and any another SIM, and wherein the limited service includes support for emergency calls from the wireless device, and receiving alerts provided by Earthquake and Tsunami Warning System (ETWS), Public Warning System (PWS) and Commercial Mobile Alert System (CMAS).

8. A method of operating a wireless device having a plurality of subscriber identity modules (SIMs), the method comprising:
   identifying a situation requiring selection of a cell to camp on for a first SIM configured to operate using a first mobile network of a first network operator, the first SIM being contained in the plurality of SIMs; and
   upon identification of the situation:
   checking whether the wireless device is in a coverage hole of the first mobile network;
   if the wireless device is in the coverage hole, determining whether any other SIM of the plurality of SIMs is already camped on a cell with support for at least limited service;
   if the any other SIM is already camped on a cell with support for at least limited service, suspending selection of the cell for the first SIM; and
   if the any other SIM is not already camped on a cell with support for at least limited service, camping on any acceptable cell for limited service.

9. The method of claim 8, wherein the cell with support for at least limited service is one of a suitable cell and an acceptable cell.

10. The method of claim 8, if the wireless device is not in the coverage hole, the method further comprising camping the first SIM in a first cell of the first mobile network.

11. The method of claim 10, wherein the first SIM is camped on a third cell prior to the identifying, such that the selection comprises a reselection.

12. The method of claim 10, further comprising:
    checking periodically whether the first SIM is camped in a suitable cell, wherein the situation comprises a determination that the first SIM is not camped in a suitable cell.

13. The method of claim 10, wherein the checking further checks whether the first SIM has been denied registration by the first mobile network, wherein the wireless device is deemed to be in the coverage hole if the first SIM has been denied registration by the first mobile network.

14. The method of claim 10, wherein the wireless device is designed to operate according to LTE (Long Term Evolution) for each of the first SIM and any other SIM, wherein the limited service includes making emergency calls from the wireless device, and receiving alerts provided by Earthquake and Tsunami Warning System (ETWS), Public Warning System (PWS) and Commercial Mobile Alert System (CMAS).

15. A non-transitory machine readable medium storing one or more sequences of instructions for operating a wireless device, wherein execution of the one or more instructions by one or more processors contained in the wireless device enables the wireless device to perform the actions of:
    identifying a situation requiring selection of a cell to camp on for a first SIM configured to operate using a first mobile network of a first network operator, the first SIM being contained in the plurality of SIMs; and
    upon identification of the situation:
    checking whether the wireless device is in a coverage hole of the first mobile network;
    if the wireless device is not in the coverage hole, camp the first SIM in a first cell of the first mobile network;
    if the wireless device is in the coverage hole, determining whether any other SIM of the plurality of SIMs is already camped on a cell with support for at least limited service;
    if the any other SIM is already camped on a cell with support for at least limited service, suspending selection of the cell for the first SIM; and
    if the any other SIM is not already camped on a cell with support for at least limited service, camping on any acceptable cell for limited service.

16. The non-transitory machine readable medium of claim 15, wherein the cell with support for at least limited service is one of a suitable cell and an acceptable cell.

17. The non-transitory machine readable medium of claim 15, wherein the first SIM is camped on a third cell prior to the identifying, such that the selection comprises a reselection.

18. The non-transitory machine readable medium of claim 15, further comprising instructions for:
   checking periodically whether the first SIM is camped in a suitable cell, wherein the situation comprises a determination that the first SIM is not camped in a suitable cell.

19. The non-transitory machine readable medium of claim 15, wherein the checking further checks whether the first SIM has been denied registration by the first mobile network, wherein the wireless device is deemed to be in the coverage hole if the first SIM has been denied registration by the first mobile network.

20. The non-transitory machine readable medium of claim 15, wherein the wireless device is designed to operate according to LTE (Long Term Evolution) for each of the first SIM and any other SIM, wherein the limited service includes making emergency calls from the wireless device, and receiving alerts provided by Earthquake and Tsunami Warning System (ETWS), Public Warning System (PWS) and Commercial Mobile Alert System (CMAS).

* * * * *